INVENTORS.
ROBERT L. MURRAY
BY ROBERT W. GUERTIN

ATTORNEYS.

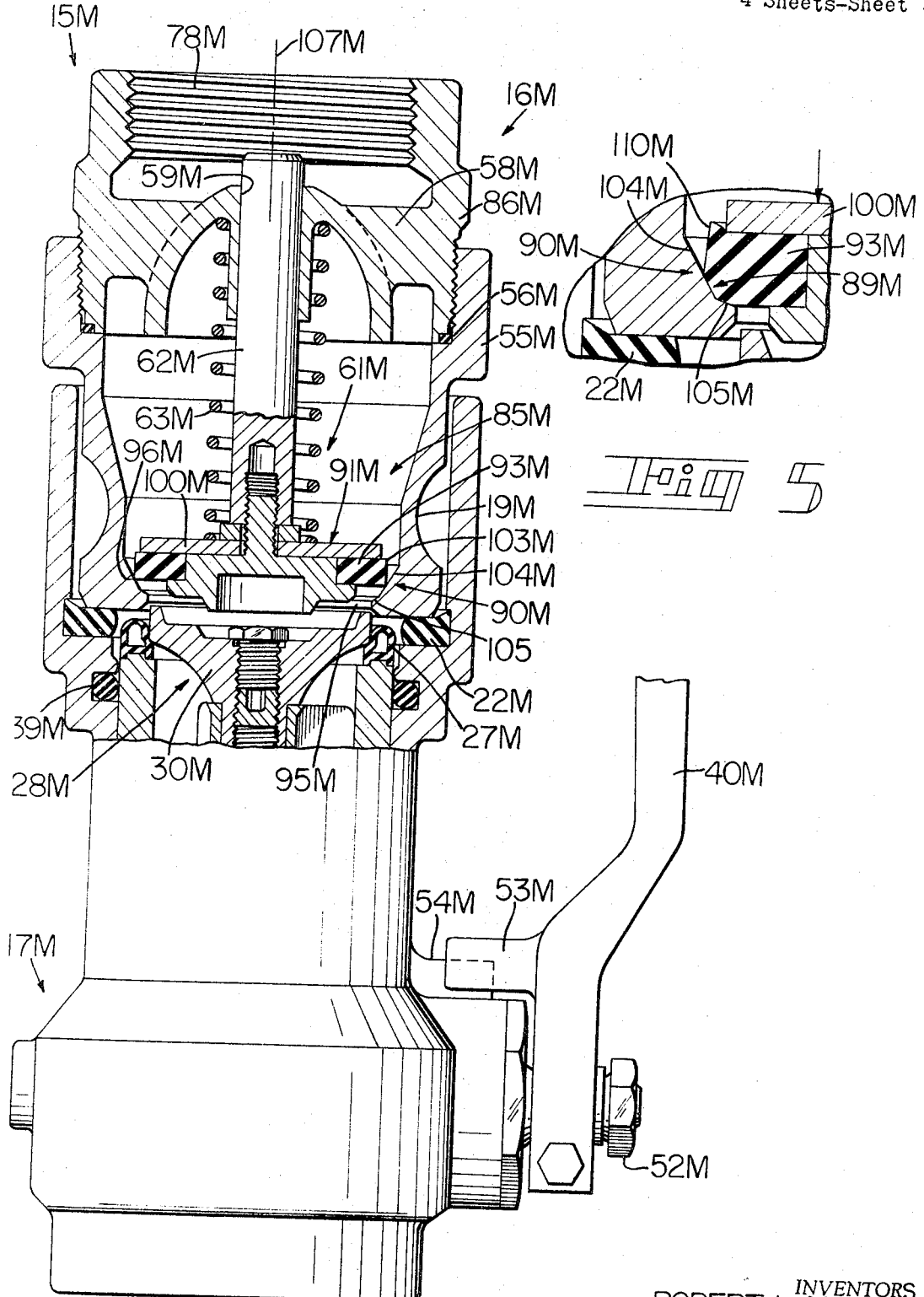

United States Patent Office 3,664,634
Patented May 23, 1972

3,664,634
VALVE SEAL FOR COUPLING DEVICE
Robert W. Guertin, 9312 Neil Drive, Cincinnati, Ohio 45231, and Robert L. Murray, 331 6th Ave., Dayton, Ky. 01074
Continuation-in-part of application Ser. No. 538,411, Mar. 29, 1966. This application Sept. 19, 1968, Ser. No. 760,948
Int. Cl. F16l 37/28, 19/00
U.S. Cl. 251—333   4 Claims

ABSTRACT OF THE DISCLOSURE

This disclosure relates to a normally closed valve for use in a fluid system which has a poppet means provided with a sealing gasket and which has an offset annular sealing surface against which the gasket is urged to provide an improved seal which assures that fluid does not leak past such sealing surface; and, a coupling device utilizing such a valve and having improved sealing characteristics.

CROSS REFERENCE TO RELATED APPLICATION

This application is a continuation-in-part of application Ser. No. 538,411, filed Mar. 29, 1966, now Pat. No. 3,473,569.

BACKGROUND OF THE INVENTION

Coupling devices of a general type disclosed in the above-mentioned copending patent application are often used in fluid systems containing fluids of a dangerous nature. Accordingly, it is important that such coupling devices prevent loss of such dangerous fluids during normal use. In particular, it is desirable to provide essentially leak-proof valve means which may be utilized in such a coupling device, or the like.

SUMMARY

This invention provides an improved normally closed valve which has an offset annular sealing surface adjacent its terminal outer end which cooperates with a gasket of an associated poppet means to provide a maximum area of sealing contact between the gasket and sealing surface to prevent leakage as well as prevent any tendency for the gasket to flow into the open area adjoining the offset sealing surface. This invention also provides an improved coupling device utilizing such an improved valve, or the like.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which

FIG. 4 is a view similar to FIG. 3 illustrating another exemplary embodiment of the coupling device of this invention and showing the lower end portion of such coupling device in elevation and the upper portion thereof in cross section; and FIG. 5 is a greatly enlarged fragmentary cross-sectional view illustrating the lower left-hand portion of the adapter comprising the coupling device of FIG. 4 and the manner in which the gasket provided in the poppet means of the adapter is sealed against an offset sealing surface to provide a fluid-tight seal with fluid pressure acting against the poppet and gasket.

Figure 1:
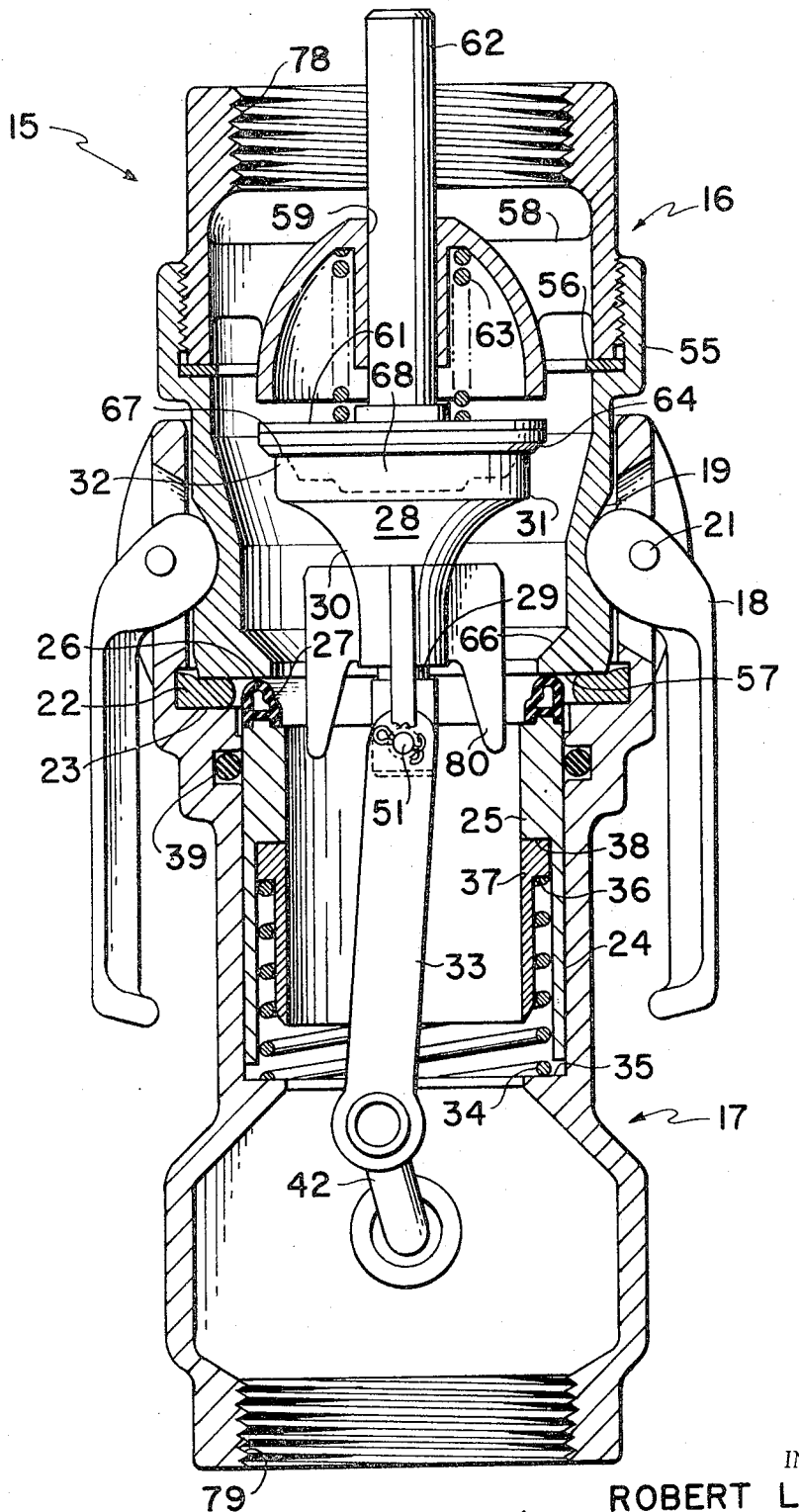
FIG. 1 is a sectional view of one exemplary embodiment of the coupling device of this invention showing fastening means for fastening and unfastening the cooperating members defining such coupling device and showing such device in the open position for fluid flow therethrough.
Figure 2:
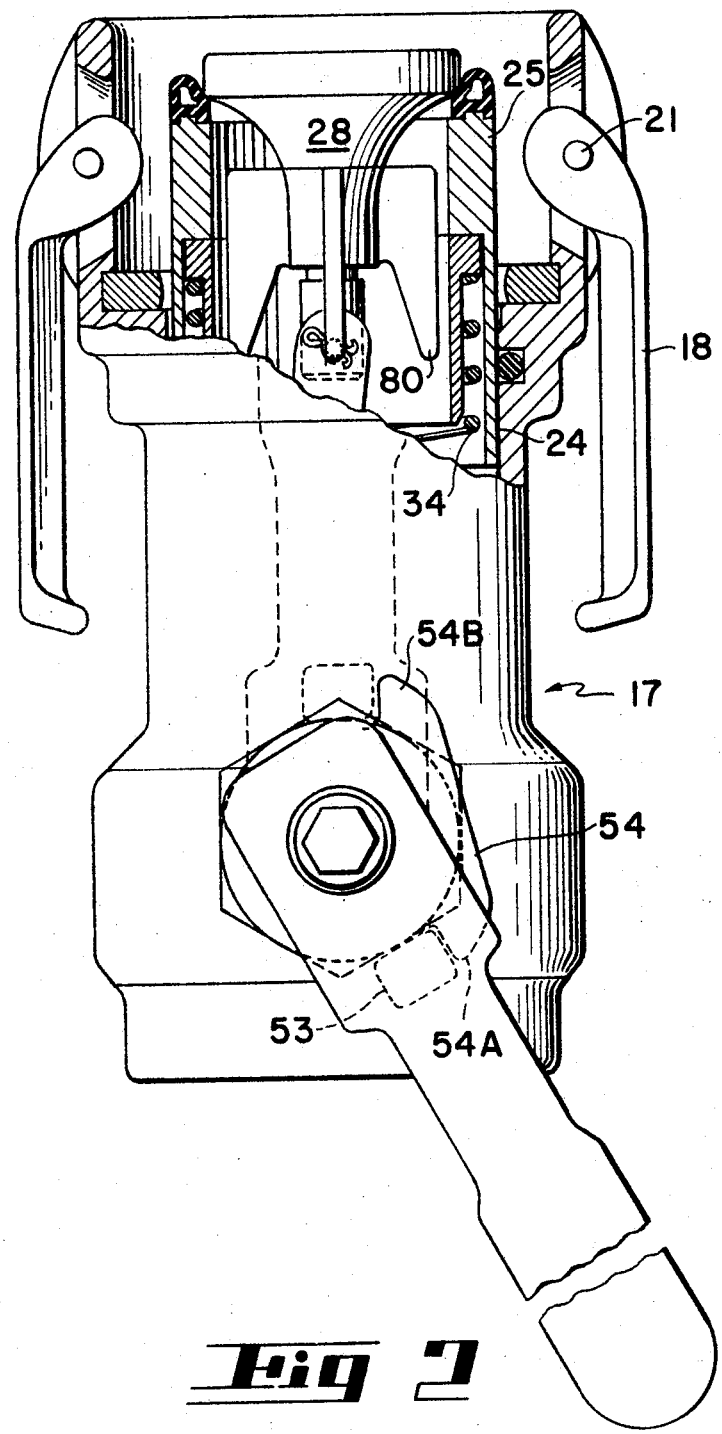
FIG. 2 is a view of the coupler portion of the coupling device of FIG. 1 with a portion of such coupler shown in section and particularly illustrating a telescoping cylindrical sleeve carried within such coupler in its extended position and an actuating handle for the actuating means provided for such coupling device.
Figure 3:
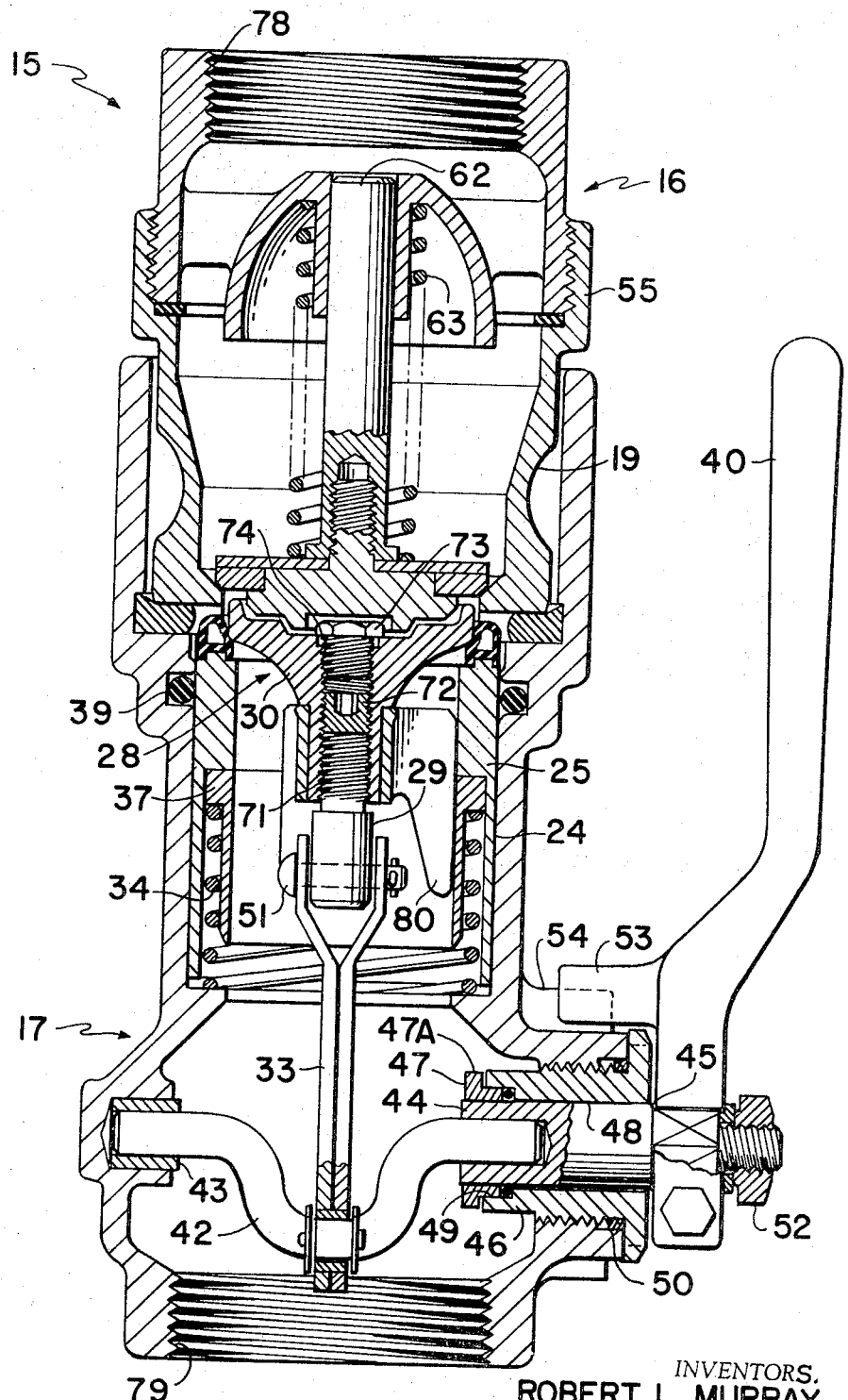
FIG. 3 is a sectional view of the coupling device of FIG. 1 with the adapter and coupler portion thereof coupled together and prior to actuating the actuating handle to thereby place such coupling in the open position for fluid flow therethrough as illustrated in FIG. 1.

In the exemplary embodiment of this invention illustrated in FIGS. 1–3 of the drawings, an improved coupling device or coupling 15 is illustrated. Coupling 15 comprises a pair of cooperating cylindrical members fastened together about a common axis by fastening means provided on such members. The cooperating members are readily fastened together irrespective of their angular positions about such axis and each includes valve means for sealing fluid therewithin upon unfastening thereof to provide a dry-break, i.e., the cooperating pair of members are taken apart essentially without spilling or losing fluid in any way. Actuating means is provided in one of such pair of cooperating members for opening and closing valve means provided within the coupling to control fluid flow through such coupling. Means is provided in valve means of such one member for keeping fluid sealed therewithin while the cooperating members are unfastened, even with inadvertent actuation of the actuating means to the open position. Furthermore, with such actuating means in the open position while the cooperating members are unfastened, a physical interference is produced preventing such members from being coupled together until the actuating means is moved to its closed position. The valved coupling device of this invention is simple to operate, inexpensive to produce, and uses a minimum of component parts; in addition, it is capable of being operated essentially in a foolproof manner, whereby spillage is kept at an absolute minimum.

As illustrated in FIG. 1 of the drawings, coupling device 15 comprises a male member or adapter 16 and a female member or coupler 17. Both adapter 16 and coupler 17 are generally right circular cylindrical in shape and the terminal end portion of adapter 16 is received in a cooperating receiving bore in an associated end portion of coupler 17.

Fastening means is provided for fastening and unfastening the adapter and coupler about a common axis and irrespective of their angular orientation about such axis. The fastening means comprises a pair of handles each designated by the numeral 18 and fastened to coupler 17 on opposite sides thereof and a cooperating annular groove 19 in adapter 16.

A pair of pivot pins 21, each designated by the numeral 21, are suitably fixed to opposite sides of coupler 17. Each pin projects from coupler 17 and extends through a cooperating opening in an associated handle 18. Each handle 18 pivots about its associated pin 21 and is held in position on such pin by any suitable means such as peening.

Each handle 18 has a contour adjacent its associated pin such that with the handle extending downwardly, as shown in FIG. 1, a portion thereof projects beyond the inner circumferential surface of coupler 17 and is received within groove 19 to thereby fasten coupler 17 and adapter 16 together to form the coupling device 15. With handles 18 extending upwardly, the previously projecting contour is rotated away from adapter 16 and its groove 19 so that such adapter may be withdrawn from within coupler 17.

Thus, it is seen that coupling 15 is uncoupled or unfastened by lifting its handles 18 toward adapter 16 to enable separation of such adapter and coupler. Coupling 15 is coupled or fastened by inserting adapter 16 within the receiving bore of coupler 17 so that the terminal and portion of adapter 16 engages seal means such as gasket 22 supported on a shoulder 23 of coupler 17 and then lowering handles 18 against the body of coupler 17.

With adapter 16 fastened in position with its terminal end portion engaging gasket 22 a fluid seal is provided assuring that fluid carried within coupling 15 and its associated conduit system does not leak out. As will be apparent from the drawings, seal 22 acts in effect as a double or backup seal while fluid is flowing through coupling 15.

Actuating means is provided for controlling fluid flow through coupling device 15. The actuating means in this example of the invention is carried by coupler 17 and the detailed description of such actuating means will be given subsequently.

Unique valve means is provided within coupler 17. With coupling device 15 in its coupled position, the actuating means carried by coupler 17 opens such valve means to allow fluid to flow through the coupling device. With coupling 15 uncoupled the valve means in coupler 17 assures that even with such actuating means in the open position fluid contained within coupler 17 does not leak out.

Coupler 17 has right circular cylindrical bore means or a cylindrical bore therein designated by the numeral 24 and a cooperating generally cylindrical sleeve 25 carried within bore 24 for telescoping movements. Lip seal means is provided on the outer terminal edge of sleeve 25 and includes a terminal sealing surface 26 corresponding generally to the circumferential outline of sleeves 25 as well as a sealing portion 27 spaced inwardly from the outer periphery of sleeve 25.

Poppet means illustrated as a poppet 28 is provided for cooperation with sleeve 25. Poppet 28 has a stem 29 arranged generally coaxially within sleeve 25 and a generally circular disk-like head portion 30. Head 30 has an inner peripheral portion 31 which cooperates with the sealing portion 27 of sleeve 25 to provide a fluid seal. Poppet 28 is supported within coupler 17 for axial movement generally along the axis of sleeve 25. The axial movement of poppet 28 is controlled by connecting means illustrated as a connecting link 33 fastened at one end to stem 29 and at its opposite end to the actuating means.

Bias means is provided for urging sleeve 25 outwardly so that its sealing portion 27 engages peripheral portion 31 of poppet head 30, as illustrated in FIG. 2, and thus provide a seal therebetween for all axial positions of poppet 28 with the adapter 16 and coupler 17 unfastened. In this example of the invention such means for urging comprises a compression spring 34. Spring 34 engages a shoulder 35 on coupler 17 at one end and an outer edge 36 of an annular transition ring 37 at its opposite end. The inner edge of transition ring 36 engages a cooperating shoulder 38 provided on sleeve 25. In effect, ring 37 extends the cylindrical bore of sleeve 25 within coupler 17 while shielding a portion of the spring 34 to provide better support therefor and help prevent turbulence in the fluid flow. An O-ring type seal 39 is also provided between coupler 17 and sleeve 25 to assure that fluid leakage does not occur between such members. Thus it is seen, as illustrated in FIG. 2, that with coupler 17 unfastened from its cooperating adapter 16, telescoping sleeve 25 is urged by spring 34 to follow poppet 28 and maintain a fluid seal throughout the entire range of travel of such poppet.

Actuating means is provided (see FIGS. 2 and 3) for opening and closing valve means in coupling 15 with adapter 16 and coupler 17 coupled together to thereby control fluid flow through such coupling. The actuating means comprise rotatable crankshaft means or crankshaft 42 carried within coupler 17 and rotatably supported in a bearing shown as sleeve bearing 43 at one of its ends and having a stem 44 fixed to its opposite end. Stem 44 extends through the generally cylindrical wall of coupler 17 and has a shoulder 45 thereon near its outer end. Bushing means 46 is provided for supporting stem 44.

Bushing 46 is threaded into coupler 17 and has a cooperating bore 48 for receiving and supporting the stem 44 along a substantial portion of its length. A stem retainer 47 is fixed to the inner end of stem 44 and has a shoulder 47a which cooperates with the inner end of bushing 46 to limit outward axial movement of stem 44. Crankshaft 42 is provided with radial support by bearing 43 and the bore 48 of bushing 46. Axial support is provided for crankshaft 42 between bushing 43 and stem 44. Bushing 46 has a cooperating counterbore 49 to receive an O-ring seal on stem 44. As seen in FIG. 3 the seal is supported between the stem 44, stem retainer 47 and bushing 46. An additional suitable seal 50 is provided between bushing 46 and coupler 17 to assure that fluid does not seep or leak out of such coupler.

Connecting means is provided for connecting crankshaft 42 to poppet 28. Such connecting means comprises connecting link 33 previously mentioned and having a bifurcate end for receiving stem 29 of poppet 28 therein. A pin 51 passes through suitably arranged holes in the end of stem 29 and the bifurcate end of link 33. Pin 51 is held in position by a cotter pin or the like. The opposite end of link 33 is provided with a bearing and is suitably fastened to crankshaft 42, such that upon rotation of crankshaft 42 connecting link 33 will provide the desired reciprocating motion of poppet 28.

An actuating handle or arm 40 is provided for crankshaft 42 and in this example arm 40 is actuated manually. Arm 40 is attached to crankshaft 42 in any suitable manner, for example, by serrating the terminal outer end of stem 44 and providing cooperating female serrations in arm 40 about an associated receiving bore therein and then holding such arm in position by a nut 52 or the like as illustrated in FIG. 3.

Handle 40 has a projection 53 adjacent its serrated end and projecting toward coupler 17. Upon rotating handle 40 projections 53 engage a stop 54 (see FIG. 2) having a pair of spaced apart surfaces 54A and 54B corresponding respectively to the outer and inner position of the actuating motion. The handle 40 in FIG. 2 is shown rotated to the position considered the open position when adapter 16 and coupler 17 are fastened together. To move handle 40 to its closed position it is rotated clockwise until projection 53 strikes surface 54B. This rotating movement is closely correlated with the desired movement of poppet 28 and the telescoping movement of cylindrical sleeve 25.

It will now be apparent from FIG. 2 that if inadvertently the actuating lever 40 were to be actuated to the open position with coupler 17 uncoupled, sleeve 25 would merely follow the poppet 28 and maintain a fluid seal throughout the entire range of movement of poppet 28.

It will be seen also in FIG. 2 that with actuator arm 40 moved to the open position illustrated, that poppet 28 and sleeve 25 are extended outwardly past their normal position of FIG. 3 and thus it would be impossible to couple the members together until such time as actuating arm 40 is moved to the closed position. Thus two features are readily illustrated, namely that inadvertent actuation of lever 40 with the coupling uncoupled does not result in loss of fluid from coupler 17 and that it is physically impossible to fasten adapter 16 and coupler 17 together until the actuating arm 40 is moved to its closed position.

Adapter 16 has a cylindrical sleeve 55 threaded thereon defining that portion of adapter 16 which is received within coupler 17. A seal 56 is provided at the threaded connection to prevent leakage of fluid out of the adapter. Sleeve 55 has a terminal outer sealing edge which engages seal 22 carried in coupler 17 and stop means illustrated at 57. It will be seen from FIG. 1 that once coupler 17 and adapter 16 are fastened together, and the actuating means is opened to the valve open position illustrated, the terminal sealing surfaces 26 provided on cylindrical sleeve 25 engages shoulder 57 and provides a fluid tight seal.

Adapter 16 has a structural portion therein indicated by the numeral 58 and such portion has a bore 59 therein arranged coaxially with the axis of adapter 16. A second poppet or an adapter poppet indicated by the numeral 61 and having a stem 62 is provided for movement within adapter 16. Stem 62 is axially slidable back and forth in bore 59 and poppet 61 is spring urged outwardly to a normally closed position by a spring 63 cooperating between portion 58 and the disk-like head of poppet 61.

Annular gasket means illustrated as a gasket 64 is fixed on the outer sealing face of the head portion of poppet 61. With device 15 uncoupled spring 63 urges poppet 61 so that gasket 64 is urged into sealing engagement with a chamber 66 provided in the terminal inner ed portion of the sleeve portion 55 of adapter 16. It will be appreciated that the angle of chamfer 66 not only assures a good seal to prevent fluid from leaking out of adapter 16 but it also assures that with wear of gasket 64 a good seal is maintained at a different area on chamfer 66.

Gasket 64 has a portion spaced inwardly from chamfer 66 and illustrated by the numeral 67. The portion 67 is engaged by the terminal outer edge 32 of poppet head 30 such that upon first coupling adapter 16 and coupler 17 as shown in FIG. 3 and then actuating the actuating handle 40 to the position shown in FIG. 1, terminal end 32 engages gasket 64 at 67 to unseat the normally closed adapter poppet 61.

The opening sequence of coupling 15 is such that upon actuating arm 40 to the open position the terminal end 32 of poppet head 30 engages gasket 64 at 67 first, immediately prior to unseating gasket 64 from chamfer 66 and sealing edge 31 of poppet 28 from its associated sealing portion 27 of cylindrical sleeve 25. This sequence although practically instantaneous assures that fluid is not trapped or will seep between poppet 61 and head 30 in the space illustrated at 68 to assure that upon subsequently actuating the actuating means to the closed position and unfastening coupling device 15 a dry break is provided.

Adjusting means is provided for adjusting the relative position of the poppet 28 with respect to coupler 17. This adjusting means assures that coupling 15 can be assembled while utilizing components having practical manufacturing tolerances consistent with economy as well as inherently providing for adjustment in the event of wear of components causing poor sealing between the poppet head 30 and sealing portion 27.

As will be apparent from FIG. 3, the poppet stem 29 is threaded into poppet head 30 as illustrated at 71. A set screw 72 is provided and is threaded from the outer end of head 30 into engagement with the threaded portion of stem 29. Set screw 72 when threaded into position acts as a lock against further movement or rotation of poppet head 30. A plug 73 is threaded into the terminal outer end of poppet head 30 and such plug has a seal 74 so that fluid cannot leak through the threaded portion. To adjust the effective position of the poppet 28 it is merely necessary to remove plug 73, loosen set screw 72, and then achieve the desired threading in or out of the poppet head 30. The set screw 72 is then threaded into engagement with the stem portion 29 of poppet 28 followed by threading plug 73 and its seal 74 in position. It will be apparent from the linkage provided that poppet 28 can swivel at the yoke portion of connecting link 33 about pin 51 and thereby is in effect self-aligning to provide a proper seal at all times and even with possible uneven wear of the cooperating sealing portions.

Having thus described the operating components of coupling 15 the operation thereof will be readily apparent from viewing the drawings. With arm 40 actuated to its normally closed position the adapter 16 and coupler 17 are fastened together by fastening arms 18 generally as previously described. Arm 40 is then rotated to allow fluid to flow through coupling 15. As arm 40 is rotated the terminal outer edge or projection 32 on poppet 28 engages the gasket 64 of poppet 61 at 67. Practically simultaneously thereafter the terminal end portion 26 of the lip seal on sleeve 25 engages the terminal end portion of adapter 16 at 57. This sequence assures fluid is not trapped between poppets 28 and 61 at 68, as previously mentioned, as well as further assuring that fluid does not leak out of coupling 15 past seal 22. Continuing to move arm 40 so that it is in its fully actuated position causes poppet 61 to be completely unseated from its chamfer seat 66 while poppet 28 moves completely away from its sealing portion 27. Thus, a complete fluid path is provided through coupling 15 as illustrated in FIG. 1. Note that in this position poppet 61 is held with its spring 63 in its compressed position and sleeve 25 is held with its spring 34 in its compressed position. If, inadvertently, arms 18 were to be moved to unfasten coupling 15, practically instantaneously, poppet 61 would be urged to seal within its adapter 16 while sleeve 25 would be urged to telescope against poppet 28 and provide a fluid seal—note that under this hypothetical condition actuating arm 40 is still in the open position. Thus a dry break is essentially provided even under these adverse conditions. As will be apparent from the foregoing description, and during normal operation, the actuating means in effect overrides valve means in both the adapter 16 and coupler 17 to provide flow through coupling 15.

Means is provided in both adapter 16 and coupler 17 for connection within a fluid system. While various types of connection means could be used, in this example threaded holes 78 and 79 are provided in adapter 16 and coupler 17 respectively.

As previously mentioned poppet 28 is supported for axial movement generally along the axis of sleeve 25. The stem 29 of poppet 28 is of course fastened to and supported by link 33. In addition, a spider at 80 in FIG. 3 is also provided to support poppet 28 along its movement.

Another exemplary embodiment of the coupling device of this invention is illustrated in FIGS. 4 and 5 of the drawings. The coupling device or coupling illustrated in FIGS. 4 and 5 is very similar to the coupling 15; therefore, such coupling is designated generally by the reference numeral 15M and parts of the coupling 15M which are substantially identical to corresponding parts of the coupling 15 will be designated by the same reference numerals as in coupling 15 also followed by the letter designation M and not described again. Only those component parts of the coupling 15M which are different from corresponding parts of coupling 15 will be designated by a new reference numeral also followed by the letter designation M and described in detail.

It will also be appreciated that the operation of the above-mentioned substantially identical component parts of the coupling 15M is substantially the same as corresponding parts of coupling 15 and reference may be made to the previous description, as desired.

The coupling 15M has a normally closed valve provided as an integral part of its adapter 16M and such valve is designated generally by the reference numeral 85M. The normally closed valve 85M has tubular outer housing means defined by a cylindrical sleeve 55M and the sleeve 55M comprises the forward portion of the adapter 16M and is threadedly fastened to a rear portion 86M of such adapter with a seal 56M arranged therebetween. The outer housing 55M has an annular groove 19M which enables the sleeve 55M and hence the overall adapter 16M to be coupled with its associated coupler 17M in a similar manner as previously described in detail in connection with the coupling 15.

The tubular outer housing means, i.e., sleeve 55M, has an offset annular ledge or chamfer which serves as a sealing surface and is designated generally by the reference numeral 90M. The sealing surface 90M is provided adjacent a terminal end of the sleeve 55M. As will be apparent from FIG. 3 of the drawings the sealing surface or chamfer 66 in the previously described embodiment of this invention is made as a smooth annular surface, i.e., it is not offset. Further, the sealing surface 66 does not provide as good a seal as the sealing surface 90M.

Poppet means (which may be referred to as second poppet means) is also provided as part of the valve 85M and is designated generally by the reference numeral 61M and has a stem 62M which is axially slidable back and forth in a bore 59M which is provided in a structural portion 58M fixed to portion 86M. The stem 62M is axially slidable back and forth in the bore 59M and the poppet 61M is urged toward a closed position by urging or spring means shown as a compression spring 63M which acts between structural portion 58M and the disk-like head 91M of the second poppet means or poppet 61M. Gasket means shown as a gasket 93M comprises the poppet means 61M and the gasket 93M is made of resilient rubber-like material, or the like, and is fastened to the outer head portion 91M.

As seen in FIGS. 4 and 5 of the drawings the compression spring 63M normally urges and holds the poppet means 61M so that the gasket 93M engages the sealing surface 90M to provide a fluid-tight seal. The offset sealing surface 90M enables the terminal outer edge portion of the gasket 93M to be yieldingly compressed in a nonplanar path, as viewed in cross section at 89M in FIG. 5, upon urging the poppet means or poppet 61M outwardly once fluid under pressure acts against the poppet 61M and in addition to the force of spring 63M whereby a maximum area of contact is provided to prevent leakage. In addition, the offset sealing surface 90M prevents any tendency for the gasket 93M to flow into the open area 95M arranged outwardly of such sealing surface.

The gasket 93M may have any suitable cross-sectional configuration and may have a configuration similar to the gasket 64 comprising the coupling 15. However, the gasket 93M preferably has a rectangular cross-sectional configuration and the outer sharp edge portion, which is substantially a right angle and indicated at 96M, is readily compressed against the sealing surface 90M in a nondeforming manner to provide an improved seal.

The poppet 61M comprises a backup washer 100M of circular peripheral outline and has a first comparatively small diameter. The gasket 93M also has a circular peripheral outline and has a second diameter which is larger than the first diameter whereby an annular portion 103M of gasket 93M protrudes radially outwardly beyond the backup washer 100M. The annular portion 103M provides a more resilient action for the gasket 93M which tends to provide a better seal between the gasket 93M and the offset sealing surface 90M particularly with fluid pressure also acting to compress the gasket 93M.

The offset sealing surface 90M of this exemplary embodiment of the invention comprises an inner comparatively large frustoconical surface 104M and a smaller outer frustoconical surface 105M arranged in adjoining end-to-end relation. The inner frustoconical surface 104M has its small diameter arranged so that it coincides with the large diameter of the outer frustoconical surface whereby there is an abrupt change of direction as the frustoconical surface 104M coincides with the frustoconical surface 105M.

The valve 85M and hence the adapter 16M and the entire coupling device 15M have a common central axis designated generally by the reference numeral 107M. The poppet 61M is arranged so that its head 91M is arranged in a plane substantially perpendicular to the central axis 107M whereby the gasket 93M is also arranged in a plane substantially perpendicular to the central axis 107M.

It has been found by test that the offset annular sealing surface 90M comprised of cooperating frustoconical surfaces 104M and 105M each arranged at an inclined angle with respect to the central axis 107M enable the provision of an optimum seal between the gasket 93M and the sealing surface 90M. In particular, it has been found that best results are obtained when the inner frustoconical surface is inclined at an angle generally of the order of 30 degrees relative the central axis and the outer frustoconical surface is inclined at an angle generally of the order of 70 degrees relative to such central axis 107M.

It has also been found that satisfactory results are provided with the frustoconical surface 104M arranged so that it is inclined at an angle ranging from 22 to 33 degrees from the central vertical axis 107M and with the frustoconical surface 105M arranged at an inclined angle ranging between 60 and 90 degrees from, i.e., relative to, the central axis 107M. The arrangment of the frustoconical surfaces 104M and 105M within the ranges described above assures that an optimum seal is provided between the gasket 93M and sealing surface 90M over extended periods of usage.

As previously indicated, the annular portion 103M provided in the gasket 93M provides a resilient action which tends to provide an improved seal and it will be seen that upon urging gasket 93M firmly against the sealing surface 90M a slight projection indicated at 110M is provided adjacent the backup washer 100M and such projection helps define the resilient action.

Although the valve 85M which in essence defines the adapter 16M has been illustrated and described as comprising an integral part of the coupling 15M it will be appreciated that such valve may also be utilized in other applications where an improved sealing surface is required in a normally closed valve of this type.

Various seals, gaskets, O-rings and the like have been described throughout this disclosure. Obviously the detailed material composition of each of such seals must be compatible with the type of fluid being handled and must have adequate sealing qualities over extended use.

While the present exemplary embodiments of this invention have been illustrated and described it will be recognized that this invention may be otherwise variously embodied and practiced within the scope of the following claims.

What is claimed is:

1. Normally closed valve for use in a fluid system comprising, a tubular outer housing for a fluid passing therethrough, a housing having frustoconical annular valve seat attached therein adjacent one terminal end thereof, a valve within the housing, the valve having a head portion and a stem portion, the stem portion extending within the housing, guide means within the housing adjacent the other terminal end and engaging the stem, a coil spring surrounding the stem and guide means, one end of the spring engaging the guide means with the other end engaging the valve head portion and urging the valve to normal closed position, the valve head portion comprising a head member, a circular backing plate and a resilient rubber-like gasket of annular configuration and rectangular shape in cross-section mounted between the head member and the backing plate, the backing plate being substantially the same size as the gasket, said gasket upon initial closing action engaging the seat on a line contact and upon further pressure by the spring being compressed to conform to the shape of the frustoconical seat to provide a maximum area of contact, said valve seat defined by an inner frustoconical surface and an outer frustoconical surface arranged in adjoining end-to-end relation, said inner frustoconical surface being larger than said outer frustoconical surface with the smaller diameter of said inner frustoconical surface coinciding with the larger diameter of said outer frusto-conical surface.

2. Normally closed valve for use in a fluid system comprising, a tubular outer housing for a fluid passing therethrough, a housing having frustoconical annular valve seat attached therein adjacent one terminal end thereof, a valve within the housing, the valve having a head portion and a stem portion, the stem portion extending within the housing, guide means within the housing adjacent the other terminal end and engaging the stem, a coil spring surrounding the stem and guide means, one end of the spring engaging the guide means with the other end engaging the valve head portion and urging the valve to normal closed position, the valve head portion comprising a head member, a circular backing plate and a resilient rubber-like gasket of annular configuration and rectangular shape in cross-section mounted between the head member and the backing plate, the backing plate being substantially the same size as the gasket, said gasket upon initial closing action engaging the seat on a line contact and upon further pressure by the spring being compressed to conform to the shape of the frustoconical seat to provide a maximum area of contact, said circular backing plate having a first diameter and said gasket having a second diameter larger than the first diameter, the annular portion of said gasket protrudes outwardly of said backing plate, said annular portion providing resilient action and giving a better seal between said gasket and said valve seat and said valve seat defined by the inner frustoconical surface and an outer frustoconical surface arranged in adjoining end-to-end relation, said inner frustoconical surface being larger than said outer frustoconical surface coinciding with the larger diameter of said frustoconical surface.

3. A valve as set forth in claim 2 having a central axis and wherein said gasket is supported in a plane substantially perpendicular to said central axis, said inner frustoconical surface is inclined at an angle generally of the order of 30 degrees from said central axis, and said outer frustoconical surface is inclined at an angle generally of the order of 70 degrees from said central axis.

4. A valve as set forth in claim 2 having a central axis and wherein said gasket is supported in a plane substantially perpendicular to said central axis, said inner frustoconical surface is inclined at an angle ranging from 22 to 33 degrees from said central axis, and said outer frustoconical surface is inclined at an angle ranging from 60 to 90 degrees from said central axis.

References Cited

UNITED STATES PATENTS

| | | | |
|---|---|---|---|
| 666,245 | 1/1901 | Ginaca | 251—Cushion Dig |
| 2,949,928 | 8/1960 | Hobson | 137—542 X |
| 2,985,424 | 5/1961 | Anderson et al. | 251—332 |
| 2,718,373 | 9/1955 | Henry | 251—333 X |
| 2,784,732 | 3/1957 | Nurkiewicz | 251—333 X |
| 1,616,672 | 2/1927 | Wilson | 251—333 |
| 3,330,257 | 7/1967 | Nurkiewicz | 251—332 |
| 2,489,623 | 11/1949 | Delany | 251—333 X |
| 2,516,927 | 8/1950 | Steirly | 251—114 B UX |
| 2,666,448 | 1/1954 | Garretson et al. | 137—540 |
| 3,332,477 | 7/1967 | Hallen | 251—332 X |
| 3,438,391 | 4/1969 | Yocum | 137—540 X |

FOREIGN PATENTS

| | | | |
|---|---|---|---|
| 880,985 | 7/1949 | Germany | 251—333 |

WILLIAM R. CLINE, Primary Examiner

U.S. Cl. X.R.

137—614.06